(12) United States Patent
Dance et al.

(10) Patent No.: US 6,512,539 B1
(45) Date of Patent: Jan. 28, 2003

(54) DOCUMENT PERISCOPE

(75) Inventors: Christopher R. Dance, Trumpingron (GB); Stuart A. Taylor, Cambridge (GB); Mauritius Seeger, Royston (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/408,872

(22) Filed: Sep. 29, 1999

(51) Int. Cl.[7] ................................................ H04N 3/08
(52) U.S. Cl. ...................................... 348/203; 348/146
(58) Field of Search ............................. 348/37, 49, 61, 348/145, 146, 202, 203; 358/474; 382/317, 323

(56) References Cited

U.S. PATENT DOCUMENTS

| | | | |
|---|---|---|---|
| 4,485,409 A | 11/1984 | Schumacher | 358/294 |
| 4,527,055 A | * 7/1985 | Harkless et al. | 348/146 |
| 5,511,148 A | 4/1996 | Wellner | 395/106 |
| 5,528,290 A | 6/1996 | Saund | 348/218 |
| 5,686,960 A | * 11/1997 | Sussman et al. | 348/218 |
| 5,705,806 A | 1/1998 | Matsuda et al. | 250/208.1 |
| 6,005,682 A | 12/1999 | Wu et al. | 358/474 |

FOREIGN PATENT DOCUMENTS

| | | |
|---|---|---|
| EP | 0676890 A2 | 11/1995 |
| EP | 0748108 A2 | 11/1996 |

OTHER PUBLICATIONS

Canon "Camera Lenses" Product Description published on Internet at http://www.usa.canon.com/camcambin/cameras/lenses.html.
Canon "EF Mount TS–E 24mm f/3.5L" published on Internet at http://www.canon.co.jp/camera–museum/lens/ef/ts_e24_35.html.
Canon "EF Mount Block diagram of TS–E24mm F3.5L" published on Internet at http://www.canon.co.jp/camera-–museum/lens/ef/ts_e24_35k.html.
Zappala, Anthony et al., "Document Mosaicing," Proceedings of British Machine Vision Conference, BMVC–97, Essex, England, Sep. 1997, Ed. A. F. Clark, pp 600–609.

* cited by examiner

Primary Examiner—Chris Kelley
Assistant Examiner—George A Bugg (57) ABSTRACT

A composite higher resolution image of an object can be obtained by combining or patching together multiple low-resolution camera images to form a composite image having a higher resolution. Each low-resolution camera image represents a subsection of an object (also referred to as "object subsection") to be scanned. For example, each subsection may represent a quadrant of a document page. With the use of a periscope, the image visible to the camera can be shifted to capture images of the various object subsections. Mosaicing techniques are used to combine these camera images into a composite image of the object. This approach to scanning improves the resolution of documents scanned while using existing low cost video cameras.

32 Claims, 9 Drawing Sheets

DOCUMENT PERISCOPE

FIELD OF THE INVENTION

The present invention relates to an image acquisition system, and more specifically, to an apparatus and method of scanning objects with a camera system.

BACKGROUND OF THE INVENTION

Recent developments in "over-the-desk" scanning take advantage of combining the functionality of traditional paper scanning devices with that of a digital camera. Over-the-desk scanning generally refers to capturing images of hardcopy documents positioned on a desktop with a camera positioned above the desktop. These captured images are digitized for further processing and then displayed on a computer monitor. An example of such an over-the-desk scanning system is disclosed by Wellner in U.S. Pat. No. 5,511,148 entitled "Interactive Copying System."

Over-the-desk scanning has many advantages over traditional scanning methods using devices such as flat-bed scanners, sheet-feed scanners and hand-held scanners that use contact scanning to reproduce high resolution images of documents. In general, contact scanning is limited to the scanning of flat objects, such as documents, and is often considered cumbersome to use because the document must be moved from its place of reading or the scanner must be moved relative to the document for scanning.

One advantage of over-the-desk scanning versus traditional contact scanning is that of convenience because it is not necessary to remove documents from their usual place of reading. This encourages a more casual type of scanning where the user is able to scan small amounts information from a document as it is encountered while reading, rather than making a note of its position in a document for scanning at a later time.

A second advantage is that the non-contact nature of over-the-desk scanning allows the capture of three-dimensional (3D) objects in addition to capturing two-dimensional (2D objects). Thus, human gestures, as well as physical media, may be captured by the over the desk scanning. For example, a pointing finger may be used to annotate a hardcopy document captured by the camera.

Over-the-desk scanning solutions are often implemented with consumer-level video cameras. Although the use of cameras to scan objects provide many advantages over traditional scanning methods, the use of consumer-level video cameras for document scanning is often limited by the resolution of the camera. Low-resolution cameras, such as consumer-level video camera, typically do not yield images with sufficient quality to enable successful document decoding using optical character recognition (OCR). For example, an OCR error rate under 1% may be achieved for 10-point Times Roman text scanned with a video camera by applying carefully created binarisation algorithms to camera images acquired at such low resolutions as 100 dots per inch (dpi). Below this resolution, the error rate and the time to recognize a page increases rapidly. Although some higher resolution cameras are available today, they are typically not cost effective for over-the-desk scanning solutions.

One approach used to improve low-resolution camera images is often referred to as "mosaicing", "tiling" or "stitching". These techniques patch together several smaller low-resolution images to create a larger image having a higher resolution. Some overlapping between the smaller low-resolution images is required in order to patch them together to form one composite image. In general, mosaicing techniques yield an increased resolution that is roughly proportional to the number of images in the mosaic.

When mosaicing, the smaller low-resolution images may be obtained in a number of ways. For example, a camera may be moved relative to a large imaging area. The camera may be manually moved by the user or automatically moved by a translational device. Unfortunately, if the camera is panned and/or tilted, perspective distortions often need to be corrected.

Alternatively, mosaicing may be performed by moving an object to be imaged (e.g., document) with respect to the camera. This type of mosaicing is only feasible when the object can be easily moved. When used for scanning documents, this method requires non-intuitive and inconvenient interaction with the user, who must move his document so that all parts of it may be seen by the camera.

However, these two types of mosaicing techniques often result in transforming images by scaling, rotation or non-linear warping relative to each other. Subsequently, detection or calibration of the transformations and restoring the images to their undistorted coordinates must be performed before mosaicing can be obtained. Not only are these operations computationally intensive, but may degrade the quality of the images.

A third type of mosaicing technique can be achieved by moving an image sensor of a camera in a plane parallel to the image plane. This generally involves extensive modification or retrofitting of an existing consumer-level camera in order to mount the image sensor on a 2-axis translation device. The inability to use commercially available consumer-level video cameras is likely to increase the cost of an over-the-desk scanning system.

Another limitation of these types of mosaicing techniques is that the speed attainable by mosaicing systems is intrinsically limited by how fast a document or a camera may be moved. Moving the document or the camera is unlikely to be as efficient as moving light with the use of a periscope. An approach that shifts light is likely to improve the efficiency of a mosaicing system while enhancing the quality of over-the-desk scanning images and maintaining the cost feasibility of over-the-desk scanning solutions.

SUMMARY OF THE INVENTION

It is an object of the present invention to increase the resolution of an image scanned with a camera system.

It is also an object of the present invention to use a periscope to shift the view of a camera to various subsections of an object.

A further object of the present invention to obtain higher resolution images from a camera system at a higher frame rate than would be possible using other mosaicing techniques.

An optical system having a rotatable inner reflective surface and a plurality of outer reflective surfaces is described. The inner reflective surface is rotated about an axis of rotation to a plurality of predetermined positions by a driving mechanism. Each of the outer reflective surfaces together with the inner reflective surface positioned at one of the predetermined positions forms a reflective light path for enabling a camera to capture light rays originating from one of a plurality of object subsections.

Also described is an optical system having a plurality of reflective surfaces and a driving mechanism attached to one or more reflective surfaces. The driving mechanism rotates the attached reflected surfaces to a plurality of predetermined locations about an axis of rotation to form a reflective light path at each predetermined location for enabling a camera to capture light rays originating from one of a plurality of object subsections.

Additionally, a camera system is described. The camera system includes an image sensor, lens system, an inner reflective surface and a plurality of outer reflective surfaces. The reflective surfaces create a plurality of reflective light paths between the image sensor and the lens system. Each light path reflects light originating from one of the plurality of subsections of an object to be captured by the image sensor.

A method of scanning an object with a camera system is also described. The object includes N subsections. The camera system includes a periscope having an inner reflective surface and a plurality of outer reflective surfaces. The inner reflective surface is positioned at a first position about its axis of rotation such that light rays originating from a first subsection of the object travel through a first reflective path formed by the inner reflective surface and a first set of outer reflective surfaces. An image of the first subsection of the object is recorded. The inner reflective surface is positioned at a next position about its axis of rotation such that light rays originating from a next subsection of the object travel through a next reflective path formed by the inner reflective surface and a next set of outer reflective surfaces. An image of the next subsection of the object is recorded. The previous two steps are repeated until all subsections of the object are recorded. The images of the N subsections are combined to produce an image of the object.

An additional method of scanning an object with a camera system is described. The object includes N subsections and the camera system includes a periscope having a set of rotatable reflective surfaces. The set of rotatable reflective surfaces is positioned at a first predetermined position about an axis of rotation such that light rays originating from a first subsection of the object travel through a first reflective path. The image of the first subsection of the object is recorded. The set of rotatable reflective surface is positioned at a next predetermined position about the axis of rotation such that light rays originating from a next subsection of an object travel through a next reflective path. The image of the next subsection of the object is recorded. The previous two steps are repeated until all images of the N subsections have been recorded. Images of the N subsections are combined to produce an image of the object.

Other objects, features, and advantages of the present invention will be apparent from the accompanying drawings and from the detailed description that follows below.

BRIEF DESCRIPTION OF THE DRAWINGS

The present invention is illustrated by way of example and not limited by the figures of the accompanying drawings, in which like references indicate similar elements and in which.

DETAILED DESCRIPTION OF THE INVENTION

A composite high resolution image of an object suitable for optical character recognition ("OCR") can be obtained by combining or patching together multiple low-resolution camera images to form a composite image having a higher resolution. Each low-resolution camera image represents a subsection of an object (also referred to as "object subsection") to be scanned. For example, each subsection may represent a quadrant of a document page. With the use of a periscope, the image visible to the camera can be shifted to capture images of the various object subsections. This approach to scanning improves the to resolution of documents scanned while allowing the use of existing consumer-level video cameras.

Figure 1:
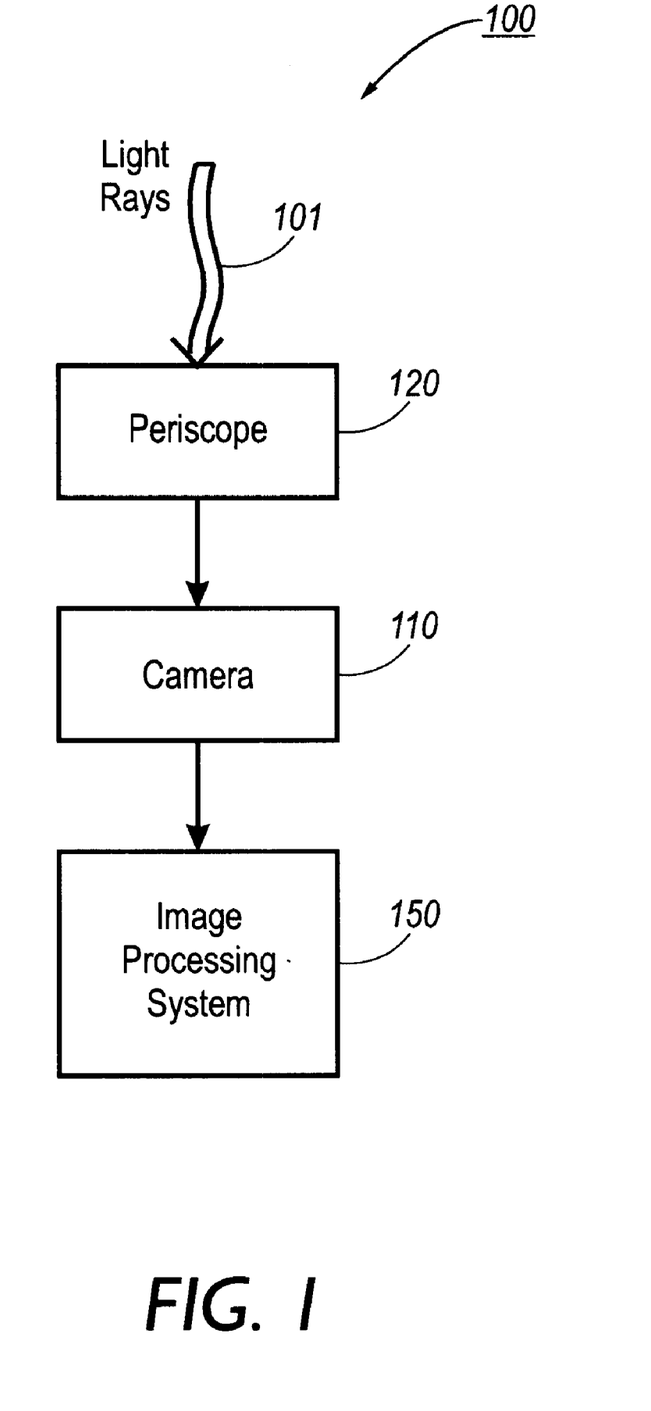
FIG. 1 illustrates an image acquisition system according to one embodiment of the present invention.

FIG. 1 illustrates an Image Acquisition System 100 for imaging an object according to one embodiment of the present invention. For convenience the object(s) to be imaged for scanning is referred to as an "object" throughout the specification. The image acquisition system 100 includes a Camera 110, a Periscope 120 and an Image Processing System 150. Arrow 101 represents light rays originating from the object. The object may include one or more two-dimensional (2D) objects (such as a page of a document), one or more three-dimensional (3D) objects (such as a human finger), a combination of 2D and 3D objects, or a portion of one or more objects. The Image Acquisition System 100 is particularly well suited for document scanning applications such as "over-the-desk" scanning.

For one embodiment of the present invention, Camera 110 is referred to as a consumer-level digital video camera. Digital video cameras typically include a lens system (or optics) that form an image on an image sensor (e.g., a charge-coupled device (CCD) array). The image sensor generally converts light into electrical signals for image processing by camera electronics and/or Image Processing System 150. Consumer-level video cameras generally refer to commercially available video cameras having a resolution (i.e., pixel count in the horizontal and vertical directions) between the range of 640×480 to 1280×960 sold to the general public at a modest price. For example, the Sony DFW V300 digital camera is considered a consumer-level video camera. For alternative embodiments of the present invention, Camera 110 may include a higher resolution video camera often used by professionals for commercial purposes or a custom camera. Additionally, Camera 110 may be a line-scan camera rather than a video camera. It should also be noted that Camera 110 may represent a single camera or a system of multiple cameras.

Camera 110 is positioned above a surface (such as a desktop or a whiteboard, or wall) such that the object can be viewed by camera 110. For one embodiment of the present invention, Periscope 120 is positioned between Camera 110 and the object such that light rays originating from the object are reflected by Periscope 120 before being recorded by Camera 110. With the use of Periscope 120 to shift the image visible to Camera 110, Camera 110 can view a larger image area.

For example, the object may contain an A4 sheet of paper (also referred to as a page of a document) having dimensions approximately 297×210 mm. Camera 110 is positioned such that only a quadrant of each page is viewed by Camera 110 at any one time. The Periscope 120 shifts the view of Camera 110 from one quadrant to another until images of all quadrants (also referred to as "camera images") have been recorded by Camera 110.

The camera images are then processed by Image Processing System 150, which is coupled to Camera 110. For one embodiment of the present invention, Image Processing System 150 is a general purpose computer. Image Processing System 150 combines the various camera images of the object to create a composite image. The various camera images represent images of subsections (e.g., quadrants) of the object and a composite image represents an image of the entire object. The Image Processing System 150 may create a composite image by various mosaicing techniques well-known in the art to increase the resolution of the camera images. By individually recording subsections of the object and then patching together the various camera images to create a composite image, the resolution of the scanned object can be improved.

For an alternative embodiment, a periscope may be integrated into a camera to form a catadioptric shift-photography system. In such a camera system, the periscope is positioned between a camera lens system and a camera sensor.

Figure 2:
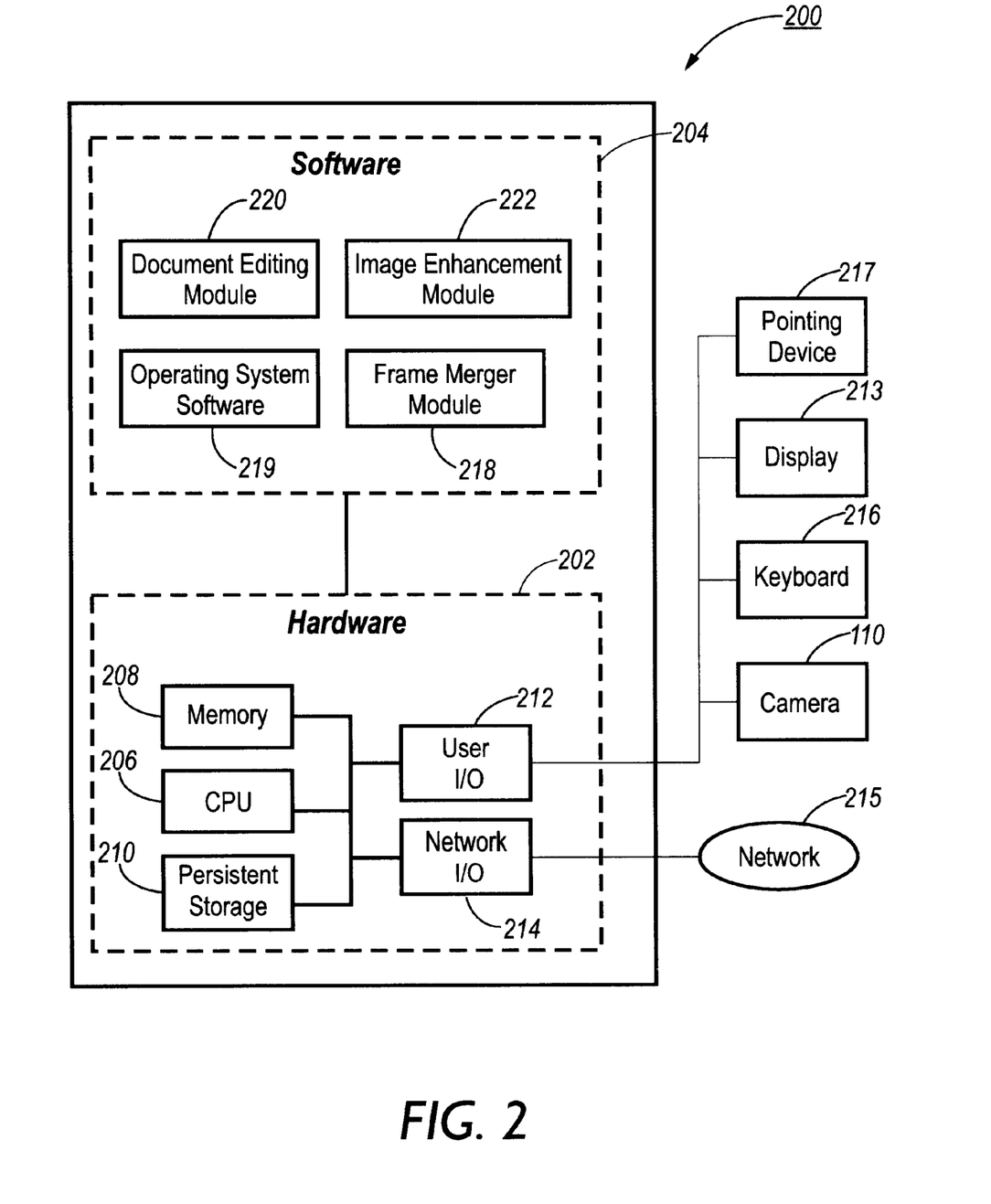
FIG. 2 illustrate a block diagram of an image processing system according to one embodiment of the present invention.

FIG. 2 illustrates a block diagram of an Image Processing System 200 according to one embodiment of the present invention. The Image Processing System 200 includes Hardware Components 202 and Software Modules 204. The Hardware Components 202 include a Processor (i.e., CPU) 206, Memory 208 (ROM, RAM, etc.), Persistent Storage 210 (e.g., CD-ROM, hard drive, floppy drive, tape drive, etc.), User I/O 212, and Network I/O 214. The User I/O 212 can include a Keyboard 216, a Pointing Device 217 (e.g., pointing stick, mouse, etc.), and a Display 213. The Camera 110 is also coupled to Image Processing System 200 via User I/O 212. The Network I/O 214 is a communications gateway of Image Processing System 200 to a Network 215 such as, a LAN, WAN, or the Internet.

The Software Modules 204 includes an Operating System 219 and various programs such as a Frame Merge Module 218, a Document Editing Module 220, and an Image Enhancement Module 222. The Operating System 219 permits Processor 206 to control the various hardware devices such as peripheral devices.

A Frame Merger Module 218 is adapted to stitch together multiple camera images for viewing on Display 213. Subsequently, if desired, the composite image generated by Frame Merger Module 218 can be enhanced or edited by invoking an Image Enhancement Module 222 or a Document Editing Module 220, respectively.

It will be appreciated by those skilled in the art that Image Processing System 200 may be a general purpose computer that can be implemented by any one of a plurality of configurations. For example, Processor 206 may in alternative embodiments be defined by a collection of microprocessors configured for multiprocessing. In yet other embodiments, the functions provided by Software Modules 204 may be distributed across multiple computers acting together as a single processing unit. Furthermore, one or more aspects of the various Software Modules 204 may be implemented in hardware, rather than software.

For additional embodiments of the present invention, Image Processing System 200 may be implemented in data processing devices other than a general purpose computer. For example, data processing may be implemented in hardware and/or software in a portable device, such as a document camera (i.e., a camera system capable of performing image processing).

Figure 3:
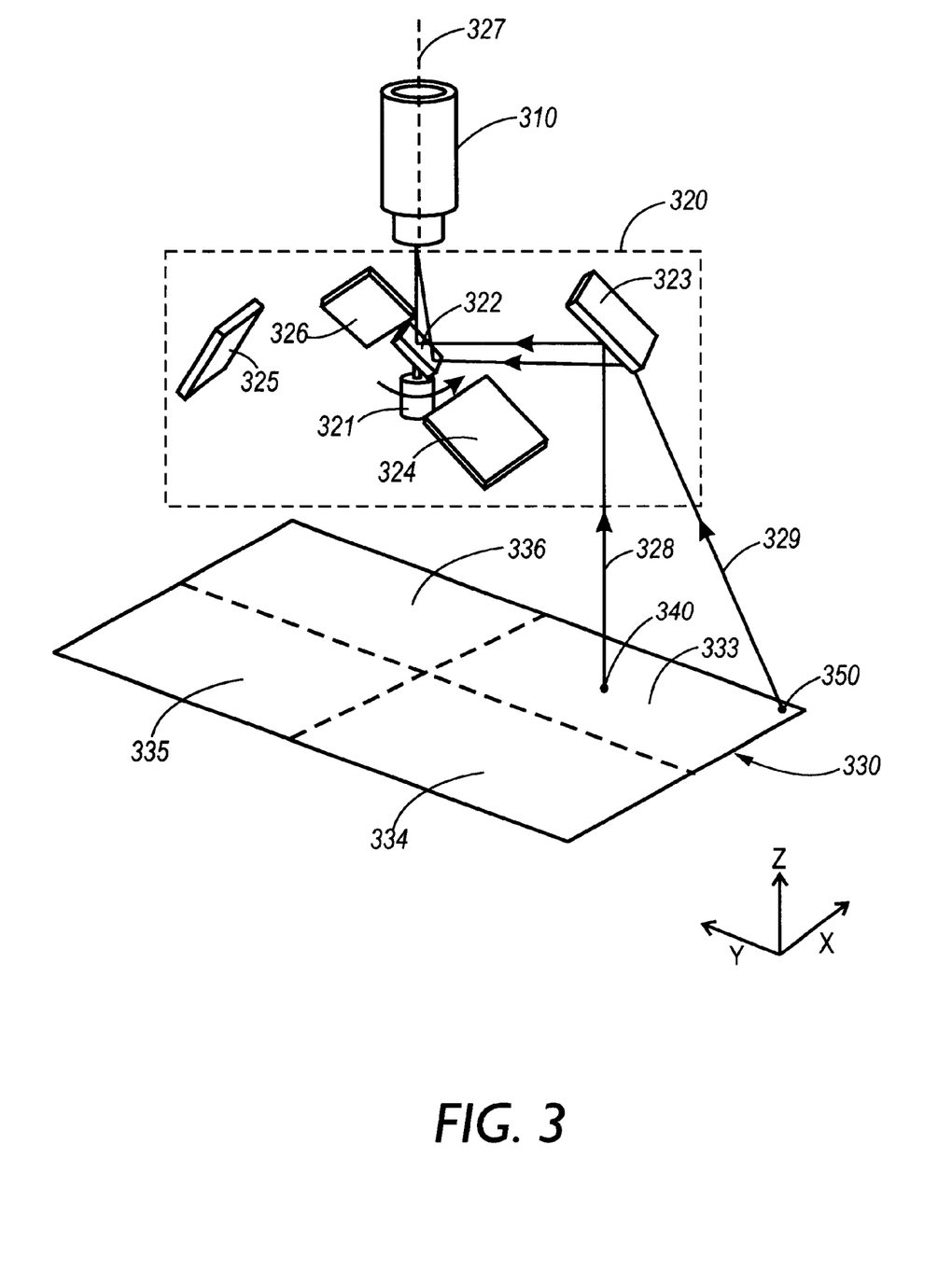
FIG. 3 illustrates a perspective view of a periscope according to one embodiment of the present invention.

FIG. 3 illustrates a perspective view of a Periscope 320 according to one embodiment of the present invention. Periscope 320 includes five reflective surfaces—one Inner Reflective Surface 322 and four Outer Reflective Surfaces 323, 324, 325, and 326. The Inner Reflective Surface 322 is attached to a Driving Mechanism 321 for rotating Inner Reflective Surface 322 about an axis of rotation, which corresponds to an Optical Axis 327 of Camera 310. As Inner Reflective Surface 322 is rotated, it is positioned at a plurality of predetermined positions. At each predetermined position, Inner Reflective Surface 322 is substantially parallel to one of the Outer Reflective Surfaces 323–326. For one embodiment of the present invention, the five reflective surfaces are mounted approximately 45 degrees to Optical Axis 327 of Camera 310.

In general, Periscope 320 is placed above a Page 330 so that the entire Page 330 can be viewed by Camera 310 as Inner Reflective Surface 322 is rotated. For this example, Page 330 represents the object. Although Page 330 appears to be blank, Page 330 generally includes text and/or graphic images.

The effect of the reflection created by Periscope 320 is equivalent to translating Camera 310 over to the center of Quadrants 333–336 and up by the additional inter-mirror path-length. Quadrants 333–336 represent subsections of Page 330. Recreating a composite image of Page 330 in this manner causes very little distortion or inversion of Page 330 while providing a means to improve the resolution of the image without increasing the resolution of the camera.

The Inner Reflective Surface 322 is rotated by Driving Mechanism 321 to a plurality of predetermined locations about its axis of rotation. For the embodiment shown in FIG. 3, Inner Reflective Surface 322 has four predetermined positions about its axis of rotation. The first predetermined position is shown in FIG. 3 with Inner Reflective Surface 322 positioned substantially parallel to Outer Reflective Surface 323. Inner Reflective Surface 322 is located at its second predetermined position when it is positioned substantially parallel to Outer Reflective Surface 324 to create a reflective light path for Quadrant 334. Inner Reflective Surface 322 is located at its third predetermined position when it is positioned substantially parallel to Outer Reflective Surface 325 to create a reflective light path for Quadrant 335. Inner Reflective Surface 322 is located at its fourth predetermined position when it is positioned substantially parallel to Outer Reflective Surface 326 to create a reflective light path for Quadrant 336. Note that FIG. 3 does not illustrate Inner Reflective Surface 322 at the second, third, and fourth predetermined positions. While positioned at each predetermined location, Inner Reflective Surface along with one of the Outer Reflective Surfaces 323–326 creates a reflective light path for one of the quadrants. Thus, as Inner Reflective Surface 322 turns about its axis of rotation and is positioned substantially parallel to one of Outer Reflective Surfaces (323–326), one of Quadrants (333–336) is viewable by Camera 310.

FIG. 3 illustrates Periscope 320 positioned to enable Camera 310 to view Quadrant 333. Light originating from an Image Point 340 of Quadrant 333 follows the path shown by arrow 328, and light originating from an Image Point 350 of Quadrant 333 follows the path shown by arrow 329. The reflective light path formed by Reflective Surfaces 322 and 323 for all points of Page Quadrant 333 allows Camera 310 to view and record Quadrant 333 within a single frame.

In FIG. 3, the number of outer reflective surfaces in Periscope 320 correspond to the number of page quadrants to be viewed. As Periscope 320 is rotated, camera images of Quadrants 333–336 are successively recorded. Although not shown in FIG. 3, Quadrants 333–336 typically have overlapping portions with one or more adjacent quadrants. This is a requirement for some of the mosaicing, tiling, and/or stitching algorithms to be performed by Image Processing System 150.

While the embodiment illustrated in FIG. 3 includes four square-shaped outer reflecting surfaces (i.e., 323–326), alternative embodiments may include more or less than four outer reflecting surfaces as long as there is at least two reflecting surfaces.

For an alternative embodiment of the present invention, a periscope may be designed to include two sets of four outer reflective surfaces. For example, a second set of four outer reflective surfaces may be added to Periscope 320 shown in FIG. 3. The second set of four outer reflective surfaces may be positioned external to the first set of four Outer Reflective Surfaces 323–326 and Inner Reflective Surface 222. Additionally, Inner Reflective Surface 322 may be vertically movable (i.e., along its axis of rotation or z-axis) so that in one vertical position, the inner mirror views one set of outer mirrors and in a second vertical position the inner mirror views a second set of outer mirrors. This type of arrangement enables the use of outer mirrors, which would otherwise occlude each other.

Additionally, the shape of the outer reflecting surfaces may deviate from a square or rectangular shape as long as various design constraints are satisfied. Examples of design constraints are described in more detail below. In certain situations, non-rectangular mirrors may be used to reduce inertia and cost.

For one embodiment of the present invention, Reflective Surfaces 322–326 are mirrors. For alternative embodiments, prisms or other types of reflective surfaces, may be used to reflect the light originating from the object to be scanned. For example, a pentaprism may be used.

It should be noted that the number of outer reflective surfaces often corresponds to the number of object subsections. For example, a periscope may include eight outer reflective surfaces to shift the view of the camera eight times to record eight different object subsections.

FIG. 3 illustrates one arrangement of reflective surfaces used to implement one embodiment of the present invention. However, it should be noted that other embodiments of the present invention may be implemented with various other arrangements of reflective surfaces. In general, the shape, dimensions, positioning and number of the reflective surfaces may vary so long as they are designed in accordance with various design requirements.

For one embodiment of the present invention, Driving Mechanism 321 is a stepper motor. By using a stepper motor and a pulse sequence to control the is rotation of Inner Reflective Surface 322, it is possible to acquire at least two mosaic images per second without motion blur. For alternative embodiments, Driving Mechanism 321 may be other types of driving mechanisms capable of rotating Inner Reflective Surface 322 about its axis of rotation at the desired speed. The axis of rotation for Inner Reflective Surface 322 is aligned with Optical Axis 327 of Camera 310.

The amount of time required by Camera 310 to record an image determines whether or not Inner Reflective Surface 322 continually rotates at a specified speed or pauses at each predetermined location. In general, the amount of time necessary to record a page quadrant (or some other subsection of the object ) by Camera 310 is dependent upon three variables: (1) the exposure time of Camera 310 (2) the frame rate of Camera 310 and (3) the time to stop and start Driving Mechanism 321. The exposure time of Camera 310 refers to the amount of time required by Camera 310 to expose the image sensor with sufficient light to form an image. The frame rate of Camera 310 refers the number of image frames that can be acquired per second.

For one embodiment of the present invention, Driving Mechanism 321 continually rotates Inner Reflective Surface 322 to capture Quadrants 333–336. A strobe light and/or a shutter positioned in front of the camera may be used to prevent motion blur. Alternatively, Driving Mechanism 321 may be required to temporarily stop Inner Reflective Surface 322 at each predetermined location in order to record Quadrants 333–336.

Figure 8:
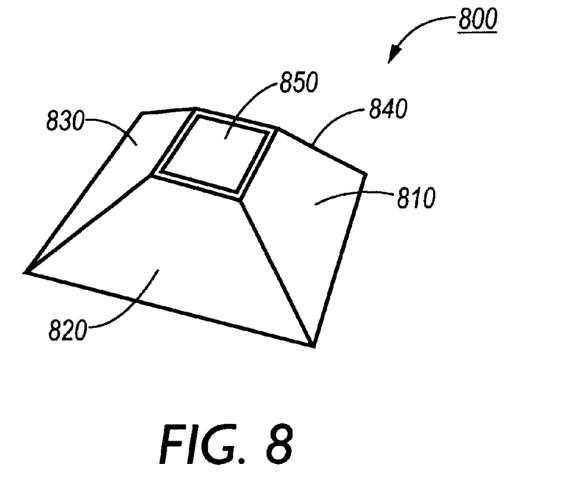
FIG. 8 illustrates a perspective top view of a periscope support structure according to one embodiment of the present invention.
Figure 9:
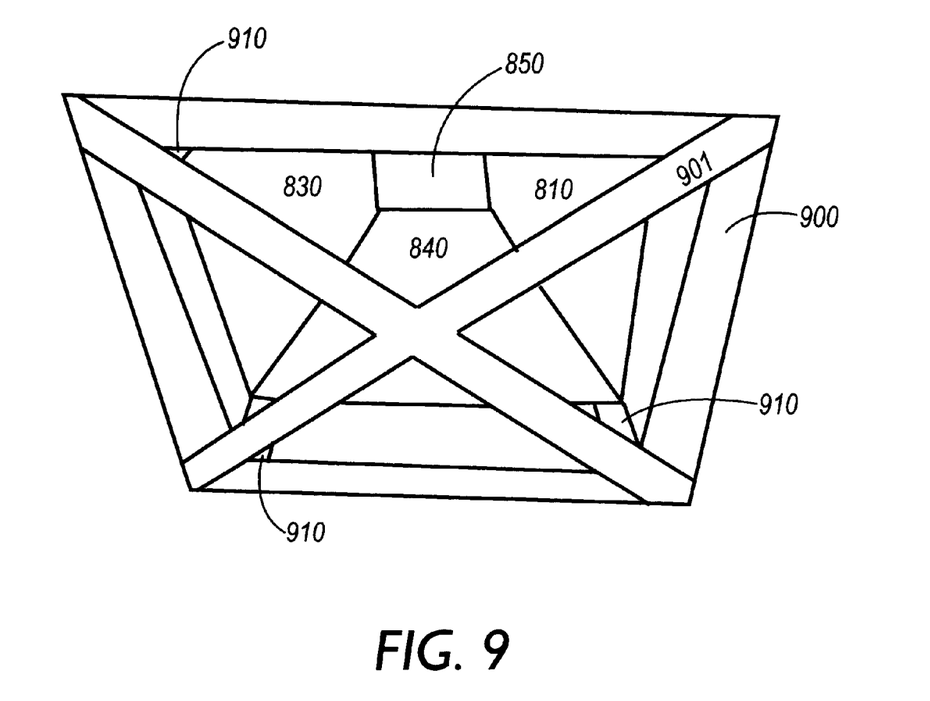
FIG. 9 illustrates a perspective bottom view of a periscope support structure according to one embodiment of the present invention.

For the embodiment shown in FIG. 3, Outer Reflective Surfaces 323–326 remain stationary as Inner Reflective Surface 322 is rotated. Inner Reflective Surface 322 is rotatably mounted onto a support structure while Outer Reflective Surfaces 322–326 are fixed. For alternative embodiments, in addition to being rotatable, the inner reflective surface may also be vertically adjustable. A suitable frame for Periscope 320 is shown in FIGS. 8 and 9, and described in further detail below. For alternative embodiments, the various outer reflective surfaces may be radially adjustable about the optical axis of a camera to vary the area visible to the camera.

Additionally, Periscope 320 is not required to record the various Quadrants 333–336 in any type of sequential order. For example, Quadrants 333–336 do not need to be viewed in a clockwise or counter-clockwise order as Inner Reflective Surface 322 is rotated. Non-sequential motion between Outer Reflective Surfaces 232–326 may be used to view only the relevant page quadrants or regions (e.g., when tracking a finger).

Furthermore, multiple cameras may be situated over one or more periscopes with each camera imaging a different page region. Additionally, periscope of the present invention may be implemented using various arrangements of reflective surfaces.

The following design constraints were taken into consideration when designing Periscope 320 shown in FIG. 3. It should be noted that the following design constraints are not a requirement for all embodiments of the present invention. Different arrangements of the reflective surfaces may use other is design constraints.

First of all, the camera was positioned to view the object at its typical height (e.g., 50 cm). More specifically, the periscope was positioned to allow the camera to view each of the object subsections such that the entire object can be viewed by the camera. The object may represent a document page or a portion of a document page. Additionally, the object may represent other 2D and/or 3D objects.

Secondly, the inner reflective surface and the outer reflective surfaces were positioned to prevent occlusions of light by the inner reflective surface prior to its reflection by the outer reflective surfaces.

Thirdly, the inner reflective surface did not intersect the camera or any of the outer reflective surfaces.

Lastly, only oblique rays, which have been reflected, pass through the camera aperture. Various other embodiments of the present invention may also adhere to these design requirements or may use a different set of design constraints.

Figure 4:
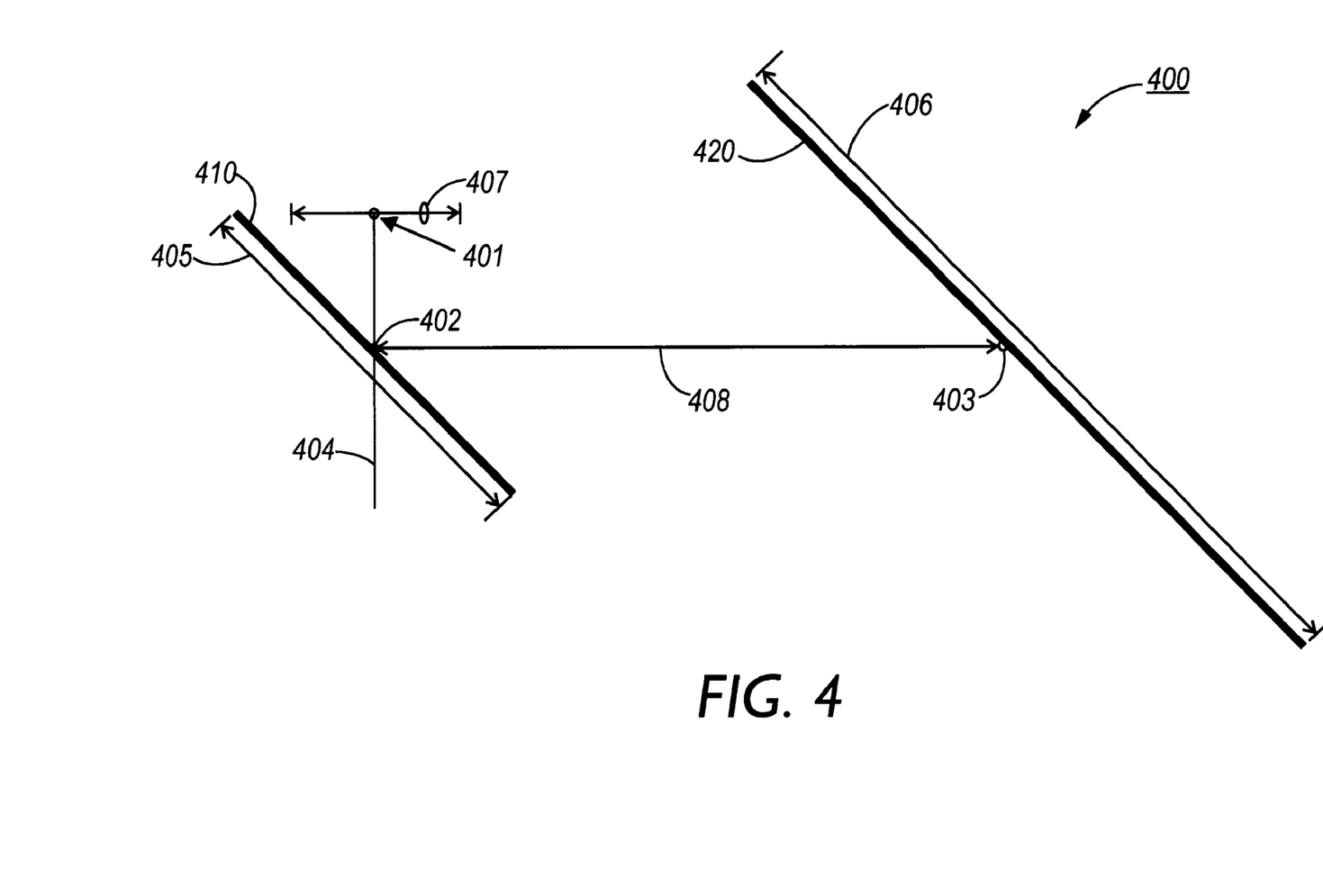
FIG. 4 illustrates a cross-sectional view of an arrangement of reflective surfaces of a periscope having one set of parallel surfaces positioned to record a page subsection according to one embodiment of the present invention.

FIG. 4 illustrates a cross-sectional view of an arrangement of reflective surfaces 400 in a periscope while positioned to record one object subsection. More specifically, a cross-sectional view of an Inner Mirror 410 at a first predetermined position and an Outer Mirror 420 in the vertical plane orthogonal to the plane of the mirrors is shown. FIG. 4 illustrates suitable numerical values for a Periscope 400 designed in accordance with the design constraints discussed above for one embodiment of the present invention.

A video camera, such as a Sony DFW V300 digital video camera, used in conjunction with Periscope 400, may be positioned and configured to view an A4 sized document page (297×210 mm) which has been divided into four page subsections (also referred to as quadrants). When the camera is viewing an A4 sized page, the minimum view area of the camera is approximately 225×300 mm, which is slightly larger than the dimensions of an A4 sized page, to allow margins for positioning. For this example, the camera sensor includes horizontal and vertical pixel counts with an aspect ratio of 3:4.

When viewing an A4 sized page, a typical height for a camera having viewing angles of 11 degrees and 14.6 degrees is 500–600 mm. This height is the distance between a camera base and the page. The camera base is defined as the intersection between a down-pointing camera's Optical Axis 404 and the highest horizontal plane that can be positioned under the camera. Note that in this example, the axis of rotation of Inner Mirror 410 corresponds to Optical Axis 404.

The Arrangement of Reflective Surfaces 400 of a periscope is positioned to record an image of a page quadrant. In order for the camera to capture all the image points of a quadrant of an A4 page, a maximum Base Aperture Diameter 407 of 24 mm was selected for this design. The base aperture is defined as the diameter of the smallest disk centered at the camera base that could act as a lens cap. This is an abstract concept defined to ensure that all oblique rays are captured. The size of the base aperture was selected such that all oblique rays that pass through the camera's aperture are reflected from the reflective light path created by the inner and outer reflective surfaces (e.g., Inner Mirror 410 and Outer Mirror 420).

The physical dimensions of the various reflective surfaces and their position with respect to one another were selected by using a ray tracing analysis. Ray tracing generally refers to techniques used to trace light rays from a light source as the rays are reflected off one or more surfaces until they hit the image plane. The path in which the reflected light rays travel is referred to as a reflective light path. For the present invention, the image plane typically coincides with the camera sensor.

Figure 5:
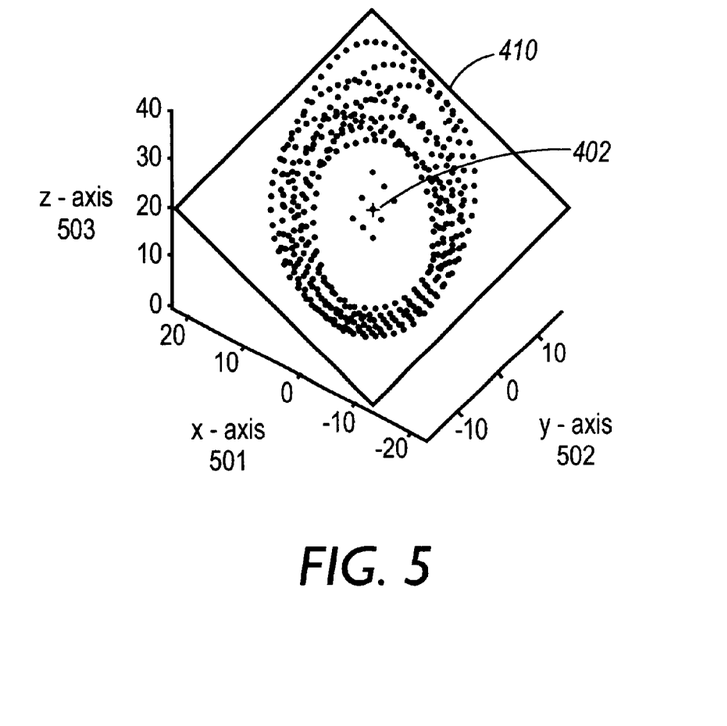
FIG. 5 illustrates a set of reflected points on an inner reflective surface is according to one embodiment of the present invention.
Figure 6:
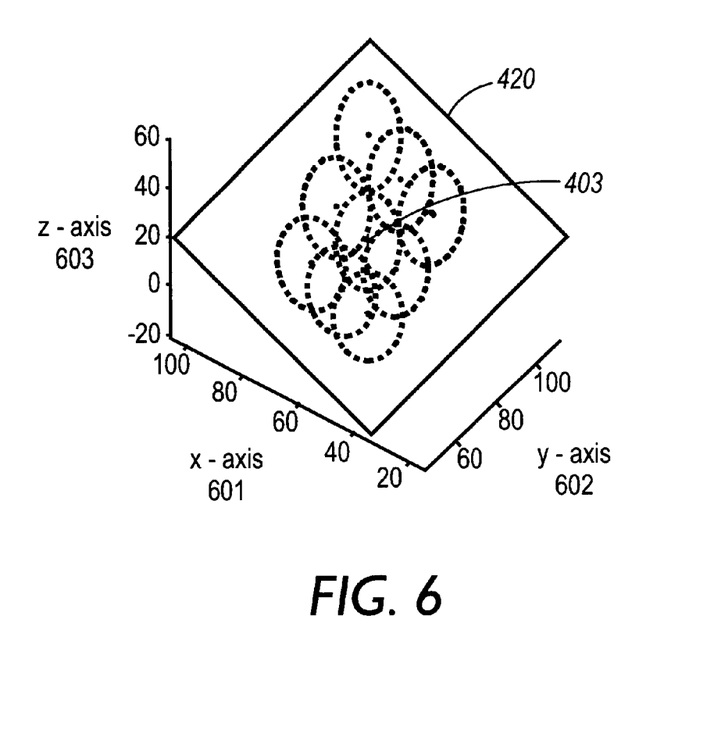
FIG. 6 illustrates a set of reflected points on an outer reflective surface according to one embodiment of the present invention.

FIG. 5, which represents Inner Mirror 410 viewed along the mirror normals, and FIG. 6, which represents Outer Mirror 420 viewed along the mirror normals illustrate a set of reflected points. FIGS. 5 and 6 use a Cartesian co-ordinate system having an Origin 401 at the camera base. The coordinate system has its x-axis parallel to the page width (positive to the right), y-axis parallel to the page length (positive to the top of the page) and z-axis parallel to Optical Axis 404 (positive from the camera to the page).

In FIG. 5, the x, y and z-axes are represented by reference numerals 501, 502, and 503, respectively. The Inner Mirror 410 has a square shape with a side-length of 40 mm. Thus, the diagonal of Inner Mirror 410 is 40√2 mm as shown by arrow 405 in FIG. 4. In FIG. 6, the x, y and z-axes are represented by reference numerals 601, 602, and 603. The Outer Mirror 420 has a square shape with a side-length of 80 mm. Thus, the diagonal of Outer Mirror 420 is 80√2 mm as shown by arrow 405 in FIG. 4.

A Centroid 402 of Inner Mirror 410 is located at the center of Inner Mirror 420 at co-ordinates (0, 0, 20) mm and a Centroid 403 of Inner Mirror 420 is located at the center of Outer Mirror 420 at co-ordinates (55.5, 74, 20) mm. A Horizontal Distance 408 between Inner Mirror 410 and Outer Mirror 420 is 92.5 mm. The normal to Inner Mirror 410 (in the first position) is (0.6, 0.8, −1)√2 mm, and the normal to Outer Mirror 420 is (0.6, 0.8, −1)√2 mm. Thus, at the first position, Inner Mirror 410 and Outer Mirror 420 are substantially parallel in this embodiment.

Figure 7:
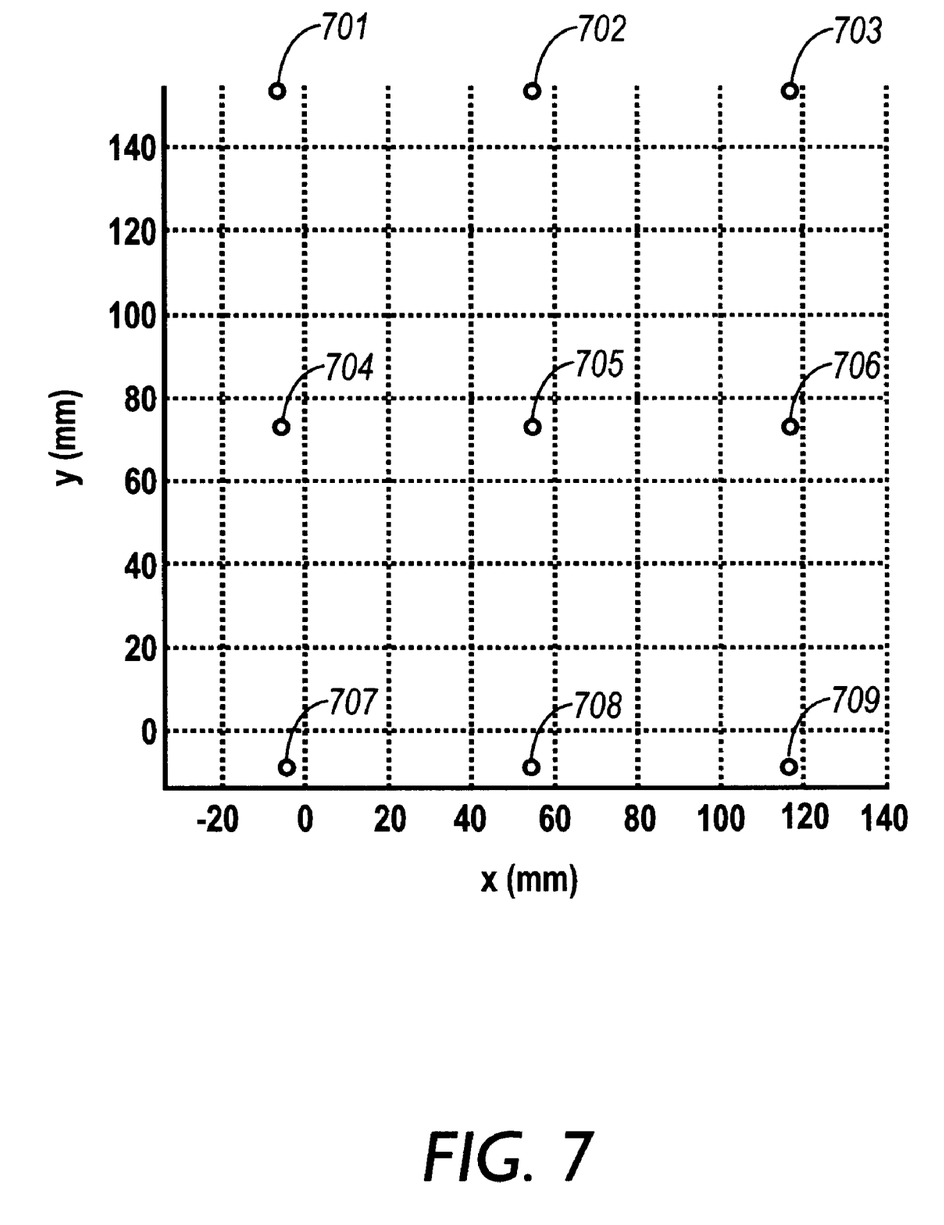
FIG. 7 illustrates a set of points arranged in a 3×3 grid within a page subsection.

Using the Arrangement of Reflective Surfaces 400 described above, a set of points within a quadrant of an A4 page is viewed by a camera for scanning. The camera includes a 640×480 image sensor and is positioned 500 mm above the A4 page. The set of points (701–709) represent nine points arranged in a regularly spaced grid (also referred to as grid-points), as shown in FIG. 7, and are reflected through the reflective light path created by Inner Mirror 410 and Outer Mirror 420.

Each of the grid-points 701–709 generate a cone of light at the base aperture of the camera. Rays striking the boundary of the base aperture are called extreme rays. Rays traversing the center of the base aperture are called paraxial rays. The set of reflected points shown in FIGS. 5 and 6 include the sites of reflection of the paraxial ray and a set of extreme rays from each of the grid-points.

The image sensor of the camera is able to capture all grid-points 701–709 from the page quadrant lying in the x-y plane when the top-left corner of the page quadrant is at (−2, 150) mm and the bottom-right corner of the page quadrant is at (113, −2). The first quadrant appears within the field of view of the camera having view angles of 11 degrees (with respect to the x-axis) and 16 degrees (with respect to the y-axis). It should be noted that the x-coordinate value of −2 of the top-left corner and the y-coordinate value of −2 of the bottom-right corner indicate an overlapping region of the first page quadrant with an adjacent page quadrant.

FIGS. 8 and 9 illustrate a periscope frame according to one embodiment of the present invention. More specifically, FIGS. 8 and 9 illustrate perspective views of Frame 800 from the top and bottom, respectively. Frame 800 includes four Mounting Sides 810, 820, 830 and 840 and is therefore well suited for Periscope 300, which includes four Outer Reflecting Surfaces 323–326. Each Outer Reflective Surface 323–326 may be attached to the interior wall of one of the Mounting Side 810, 820, 830, and 840. At the top of Frame 800 is a square-shaped Opening 850. Opening 850 provides an opening for the camera lens.

The bottom view of Frame 800 is shown in FIG. 9. The Frame 800 includes a Base 900 having four legs attached together to form a square and Base Mount 901 in the form of a cross. The Base Mount 901 is attached to the four legs. An inner reflective surface, such as Inner Reflective Surface 322 may be mounted on the cross-section of Base Mount 801. The Mounting Sides 810, 820, 830, and 840 are attached to Base 900 via four Connective Devices 910.

For alternative embodiments, the frame may be designed to be collapsible so that the periscope is more portable. Additionally, the periscope may be designed to have detachable frame components. Detachable frame components allows the periscope to be easily reconfigured. For example, it may be desirable to upgrade a periscope configured as an A4 scanner into an A3 scanner, or to customize the periscope to image various shaped regions. This can be accomplished by attaching additional outer reflective surfaces in a regular arrangement and causing the inner reflective surface to become parallel to these additional surfaces in addition to the original outer reflective surfaces.

Calibration of the periscope is typically performed during manufacturing and testing to ensure that the reflective surfaces are properly mounted onto the support structure. Under certain circumstances, it may be desirable to calibrate the periscope prior to use in an image acquisition system. Various calibration methods may be performed to determine a set of parameters to correct any misalignment of the reflective surfaces. For example, auto-calibration may be performed by zooming the camera out and determining correspondences between points lying in the overlap between viewed quadrants. Alternatively, for cameras without zoom and without a known test-page, it is possible to use multiple views at which the inner reflective mirror is not exactly parallel to the outer reflective surfaces.

The embodiments of the present invention described above generally illustrate a reflective light path having an inner reflective mirror and an outer reflective mirror. However, for alternative embodiments of the present invention, intermediate mirrors may be introduced between an inner reflective surface and an outer reflective surface for the purpose of conducting light behind some of the outer mirrors, or for the purpose of introducing extra path-length to reduce the effective angulation of the optical axis.

It should be noted that FIG. 4 illustrates an arrangement of reflective surfaces in which an inner reflective surface (when positioned at a predetermined location about the optical axis for viewing of a particular object subsection) is substantially parallel with an outer reflective surface. In FIG. 4, Inner Mirror 410 is substantially parallel to Outer Mirror 420 when recording a corresponding page quadrant. For alternative embodiments, an inner reflective surface may not be substantially parallel to an outer reflective surface when viewing a particular object subsection. Varying the angle of an inner reflective surface with respect to the optical axis has an effect equivalent to tilting the optical axis of the camera relative to the plane of the object in a manner similar to a pan-and-tilt head mechanism. The benefit of this type of modification is to reduce the dimensions of the periscope, and hence improve its cost and aesthetic quality. This type of periscope may be referred to as a "reduced dimension periscope."

Figure 10:
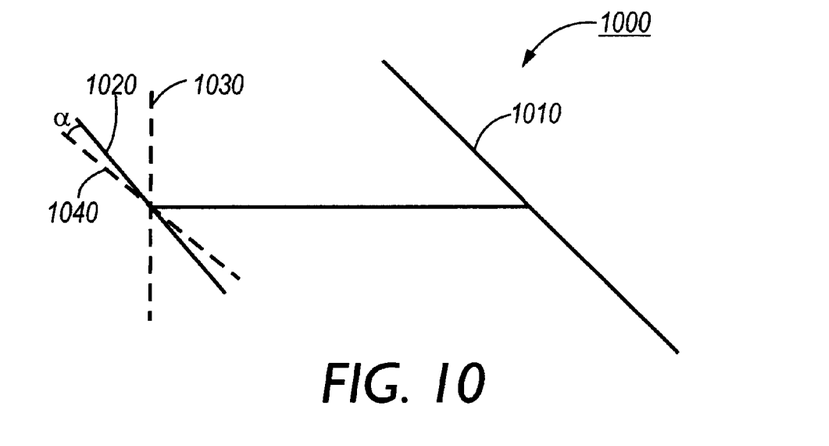
FIG. 10 illustrates a cross-sectional view of an arrangement of reflective surfaces of a periscope having non-parallel reflective surfaces positioned to record a page subsection according to one embodiment of the present invention.

FIG. 10 illustrates a cross-sectional view of an Arrangement of Reflective Surfaces 1000 of a periscope in a predetermined position in which the angle of an Inner Mirror 1020 varies from the angle of an Outer Mirror 1010. Dotted line 1030 represents an optical axis of a camera. An angle α formed between Inner Mirror 1020 and a dotted line 1040 (which represents the angle of Outer Mirror 1010) illustrates the variation in angles between the inner and outer reflective surfaces.

For one embodiment of the present invention, a periscope having reduced dimensions (also referred to as a "reduced dimension periscope") has the following parameters. The reduced dimension periscope has a bounding box of 203× 156 mm when configured to scan A4 or letter pages. This means that the entire periscope, including all reflecting surfaces, the driving mechanism and the support structure can fit into a box having those dimensions. Furthermore, the angle a is approximately 3 degrees such that the normal to Inner Mirror 1020 is (0.446, 0.595, −0.669) and the normal to Outer Mirror 1010 is (0.6, 0.8, −1) √2 with view angles of 12 degrees and 16 degrees. This particular configuration introduces only a very slight image distortion and works well even for quite large camera apertures. If the angle of Inner Mirror 1020 was remotely adjustable it may be used to compensate for the positioning of a periscope, particularly if a camera does not have a zoom feature.

Figure 11:
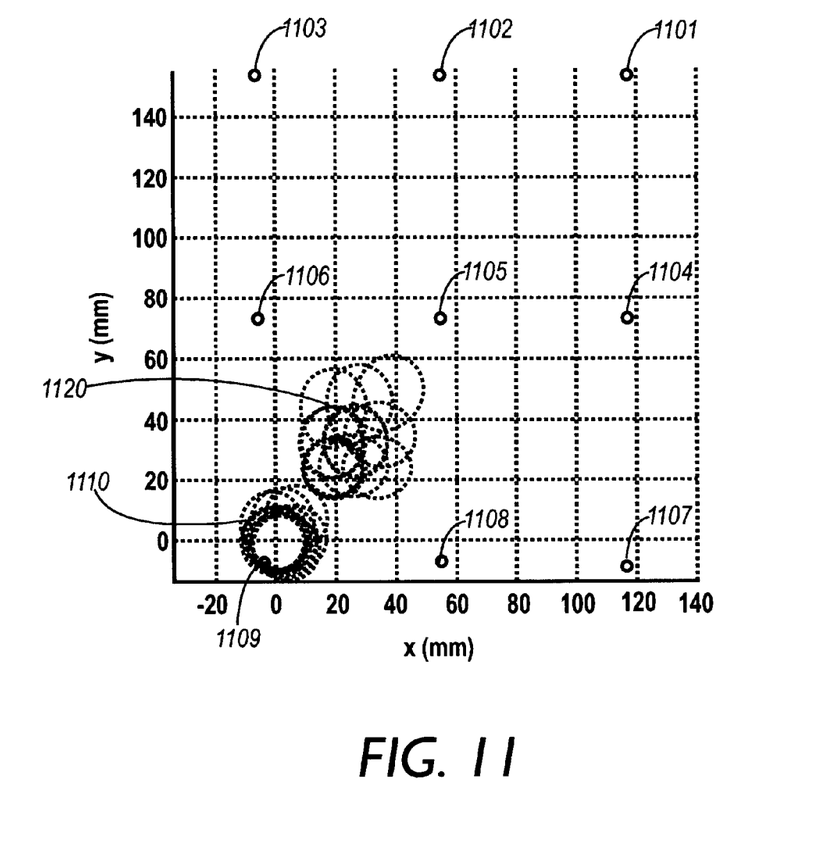
FIG. 11 illustrates a set of reflected points on an inner reflective surface and an outer reflective surface of a reduced dimension periscope according to one embodiment of the present invention.

FIG. 11 illustrates a set of reflected points projected onto an x-y plane to demonstrate the feasibility of a periscope with slightly non-parallel reflective inner and outer mirrors when viewing a page subsection. The nine small circles 1101–1109 arranged in a 3×3 grid on a page over the area visible to the camera (i.e., page subsection). The set of points 1110 represent the set of reflected points on Inner Mirror 1010, and the set of points 1120 represent the set of reflected points on Outer Mirror 1120.

FIG. 11 illustrates that the viewed area is sufficient although the effective tilt of the optical axis introduces a slight distortion, which is most apparent from the positions of the uppermost black The non-overlapping nature of the convex hulls corresponding to the set of points 1110 and the set of points 1120 indicates that Inner Mirror 1020 does not intersect Outer Mirror 1101 when rotating.

Although not apparent from the diagram, Inner Mirror 1020 and Outer Mirror 1010 do not intersect the camera base plane since the uppermost reflection on the mirror has z=5.7 mm. Furthermore, the inner mirror does not occlude any rays between the page and the outer mirror. This is evident since the convex hulls of the sets of points 1110 and 1120 do not intersect.

Figure 12:
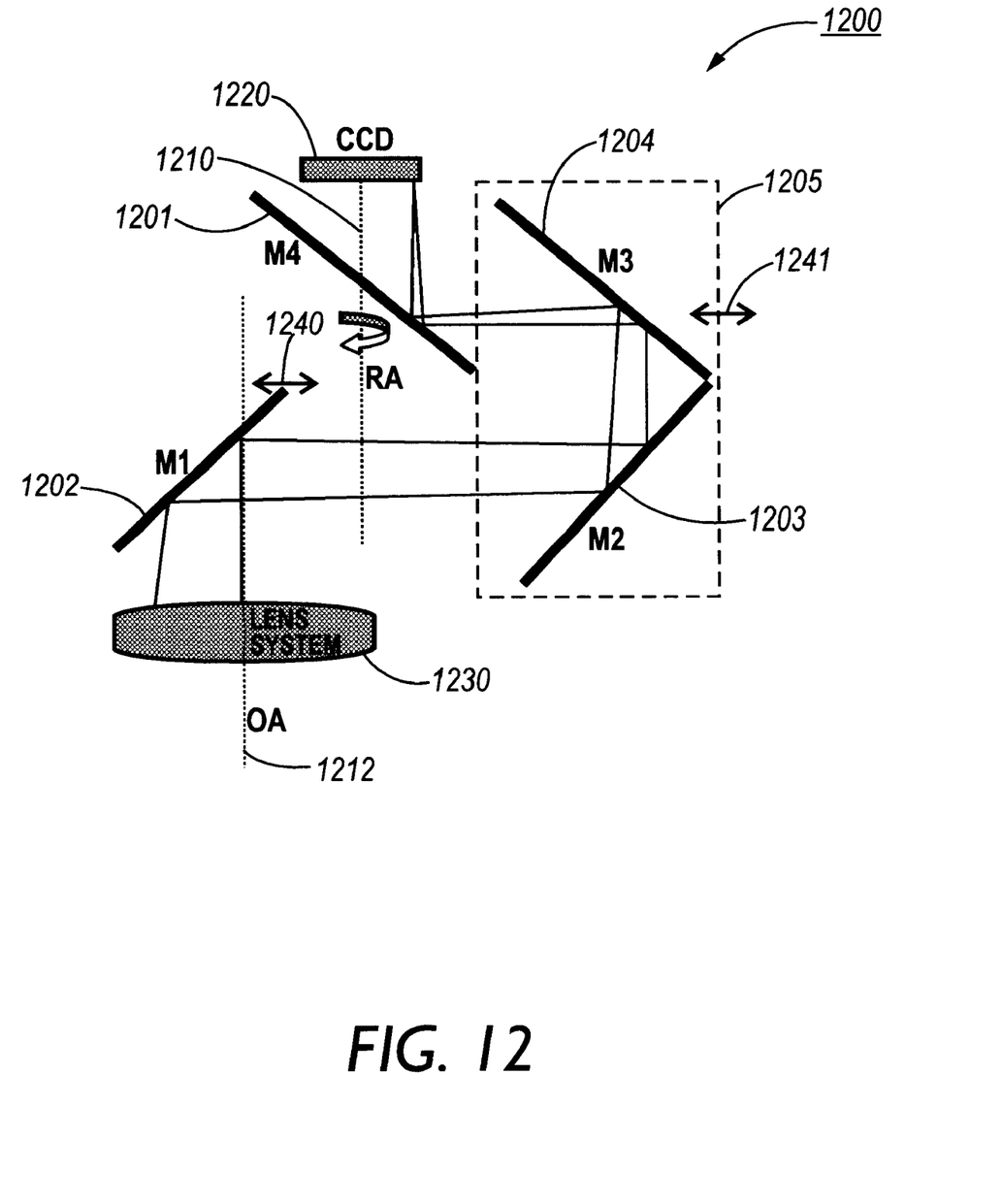
FIG. 12 illustrates a cross-sectional view of an arrangement of reflective surfaces of catadioptric shift-photography system according to one embodiment of the present invention.

FIG. 12 illustrates one embodiment of a Camera System 1200 having a periscope behind the camera lens. This type of camera system may be referred to as a "catadioptric shift-photograpy system" or a "post-lens system." More specifically, FIG. 12 illustrates a cross-sectional view of an arrangement of reflective surfaces positioned between a Camera Lens 1230 and a Camera Sensor 1220 (e.g., CCD). In addition to object (e.g., document) scanning applications, Camera System 1200 may be used for vibration control.

The Camera System 1200 includes four reflective surfaces arranged in two sets of substantially parallel reflective surfaces. The first set of substantially parallel reflective surfaces includes Reflective Surfaces 1202 (outer) and 1203 (outer) and the second set of substantially parallel reflective surfaces includes Reflective Surfaces 1201 (inner) and 1204 (outer). Reflective Surfaces 1201–1204 rotate rigidly about a common Rotational Axis 1210, which is taken to be normal to Camera Sensor 1220 through the centroid of the camera sensor. The Optical Axis 1212 of Camera Lens 1230 is substantially parallel to the Rotational Axis 1210, but not necessarily aligned with Rotational Axis 1210. centroid of the camera sensor. The Optical Axis 1212 of Camera Lens 1230 is substantially parallel to the Rotational Axis 1210, but not necessarily aligned with Rotational Axis 1210.

For one embodiment, Reflective Surfaces 1201–1204 are mirrors mounted 45 degrees with respect to Rotational Axis 1210. Reflective Surfaces 1202, 1203, and 1204, can translate radially about Rotational Axis 1210 as indicated by arrow 1240 for Reflective Surface 1202 and arrow 1241 for Reflective Surfaces 1203 and 1204. During such radial translation, Reflective Surfaces 1203 and 1204 move as a unit 1205 while Reflective Surface 1202 moves In the same direction but by twice the distance moved by Reflective Surfaces 1203 and 1204. Thus, the motion of Reflective Surface 1202 selects rays of light to reach Camera Sensor 1220, while Reflective Surfaces 1203 and 1204 prevent defocus due to translation of Reflective Surface 1202 by equalizing the total path-length. Furthermore, Camera System 1200 is shrouded against stray light.

In the foregoing specification, the invention has been described with is reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An optical system, comprising:
   an inner reflective surface having an axis of rotation;
   a driving mechanism attached to the inner reflective surface and operable to rotate the inner reflective surface to a plurality of predetermined positions about the axis of rotation; and
   a plurality of stationary outer reflective surfaces, wherein each of the outer reflective surfaces together with the inner reflective surface positioned at one of the predetermined positions about the axis of rotation forms a reflective light path for enabling a camera, with an optical axis aligned with the axis of rotation of the inner reflective surface, to capture light rays originating from one of a plurality of object subsections.

2. The optical system of claim 1, further comprising a plurality of sets of intermediate reflective surfaces, each set together with a corresponding outer reflective surface and the inner reflective surface positioned at one of the predetermined positions about the axis of rotation enables the camera to capture light rays originating from one of the plurality of object subsections.

3. The optical system of claim 2, wherein each of the sets of the intermediate reflective surfaces includes one or more intermediate reflective surfaces.

4. The optical system of claim 1, further comprising a support structure wherein the plurality of outer reflective surfaces are mounted on the support structure.

5. The optical system of claim 4, wherein the inner reflective surface is mounted on the support structure.

6. The optical system of claim 1, wherein at least one of the outer reflective surfaces is substantially parallel to the inner reflective surface when positioned at one of the predetermined positions about the axis of rotation.

7. The optical system of claim 1, wherein the driving mechanism is a motor.

8. The optical system of claim 1, further including a camera having an optical axis aligned with the axis of rotation, the camera operable to record an image of each of the object subsections within a single frame as the inner reflective surface is rotated about the axis of rotation.

9. The optical system of claim 1, wherein the inner reflective surface and the outer reflective surfaces are mirrors angled approximately 45 degrees with respect to the axis of rotation of the inner mirror such that each outer reflective surface is substantially parallel to the inner reflective surface when the inner reflective surface is positioned at one of the predetermined positions about the axis of rotation.

10. The optical system of claim 1, wherein the outer reflective surfaces are mirrors angled approximately 45 degrees with respect to the angle of rotation of the inner mirror and the inner mirror is angled less than 45 degrees with respect to the angle of rotation.

11. The optical system of claim 1, wherein the inner reflective surface is positionable along the axis of rotation.

12. The optical system of claim 8, further comprising an image processing system coupled to the camera and operable to combine the plurality of camera images to form a composite image of the object.

13. A camera system, comprising:
   an image sensor;
   a lens system;
   an inner reflective surface and a plurality of outer reflective surfaces operable to create a plurality of reflective light paths between the image sensor and the lens system, each reflective light path reflecting light originating from one of a plurality of subsections of an object to be captured by the image sensor;
   wherein the inner reflective surface and the outer reflective surfaces are rotatable to a plurality of predetermined positions about an axis of rotation.

14. The camera system of claim 13, wherein the image sensor captures an image of one of the subsections of the object while the inner reflective surface and the plurality of outer reflective surfaces are positioned at one of the predetermined positions about the axis of rotation.

15. The camera system of claim 14 configured to record all subsections of the object by successively capturing each subsection through one of the reflective light paths.

16. The camera system of claim 13, wherein the plurality of outer reflective surfaces includes first, second and third outer reflective surface, and wherein the first and second outer surfaces are substantially parallel, and wherein the third outer surface and the inner outer surface are substantially parallel.

17. The camera system of claim 13, wherein the axis of rotation is normal to the image sensor and passes through a Centroid of the image sensor.

18. The camera system of claim 13, wherein the rotational axis is parallel to an optical axis of the lens system.

19. A camera system, comprising:
   an image sensor;
   a lens system;
   an inner reflective surface and a plurality of outer reflective surfaces operable to create a plurality of reflective light paths between the image sensor and the lens system, each reflective light path reflecting light originating from one of a plurality of subsections of an object to be captured by the image sensor;

wherein the plurality of outer reflective surfaces are operable to translate radially about the axis of rotation.

20. The camera system of claim 19, wherein a first and second outer reflective surfaces translate radially as a unit, while a third outer reflective surface translates radially in the same direction but by twice the distance.

21. A method of scanning an object with a camera system, the object including N subsections and the camera system including an optical axis and a periscope having an inner reflective surface rotatable about an axis of rotation and N sets of outer reflective surfaces, comprising the steps of:

(a) aligning the optical axis of the camera system and the axis of rotation of the inner reflective surface;

(b) rotating an inner reflective surface at a first position about the axis of rotation of the inner reflective surface such that light rays originating from a first subsection of the object travel through a first reflective path formed by the inner reflective surface and a first set of outer reflective surfaces that is stationary;

(c) recording an image of the first subsection of the object;

(d) rotating the inner reflective surface at a next position about the axis of rotation of the inner reflective surface such that light rays originating from a next subsection of an object travel through a next reflective path formed by the inner reflective surface and a next set of outer reflective surfaces that is stationary;

(e) recording an image of the next subsection of the object; and (f) repeating steps (d) and (e) until all images of the N subsections have been recorded; and (g) combining the images of the N subsections to produce an image of the object.

22. The method of claim 21, wherein each set of outer reflective surfaces includes at least one outer reflective surface.

23. The method of claim 22, wherein step (9) includes the step of stitching together the images of the N subsections to generate the image of the object, wherein the stitched image has a higher resolution than the images of the N subsections.

24. A method of scanning an object with a camera system, the object including N subsections and the camera system including a periscope having a set of reflective surfaces including an inner reflective surface and a plurality of outer reflective surfaces, comprising the steps of:

(a) rotating the set of reflective surfaces at a first predetermined position about an axis of rotation such that light rays originating from a first subsection of the object travel through a first reflective path;

(b) recording an image of the first subsection of the object;

(c) rotating the set of reflective surface at a next predetermined position about the axis of rotation such that light rays originating from a next subsection of an object travel through a next reflective path;

(d) recording an image of the next subsection of the object; and (e) repeating steps (c) and (d) until all images of the N subsections have been recorded; and (f) combining the images of the N subsections to produce an image of the object.

25. The optical system of claim 1, wherein only a single one of the plurality of outer reflective surfaces forms a reflective light path with the inner reflective surface at each of the predetermined positions.

26. The optical system of claim 2, wherein light rays from only one of the object subsections is captured by the camera at any one of the predetermined positions.

27. The optical system of claim 8, wherein only one of the object subsections is captured by the camera at any one of the predetermined positions.

28. The camera system of claim 13, further comprising an image processing system operable to combine the plurality of subsections of an object captured by the image sensor to form a composite image of the object.

29. The camera system of claim 19, further comprising an image processing system operable to combine the plurality of subsections of an object captured by the image sensor to form a composite image of the object.

30. The camera system of claim 19, wherein the plurality of outer reflective surfaces includes first, second and third outer reflective surface, and wherein the first and second outer surfaces are substantially parallel, and wherein the third outer surface and the inner outer surface are substantially parallel.

31. The camera system of claim 19, wherein the axis of rotation is normal to the image sensor and passes through a centroid of the image sensor.

32. The camera system of claim 19, wherein the rotational axis is parallel to an optical axis of the lens system.

* * * * *